(No Model.)
F. W. OHLINGER.
SEED PLANTER.
No. 507,924.
3 Sheets—Sheet 1.
Patented Oct. 31, 1893.
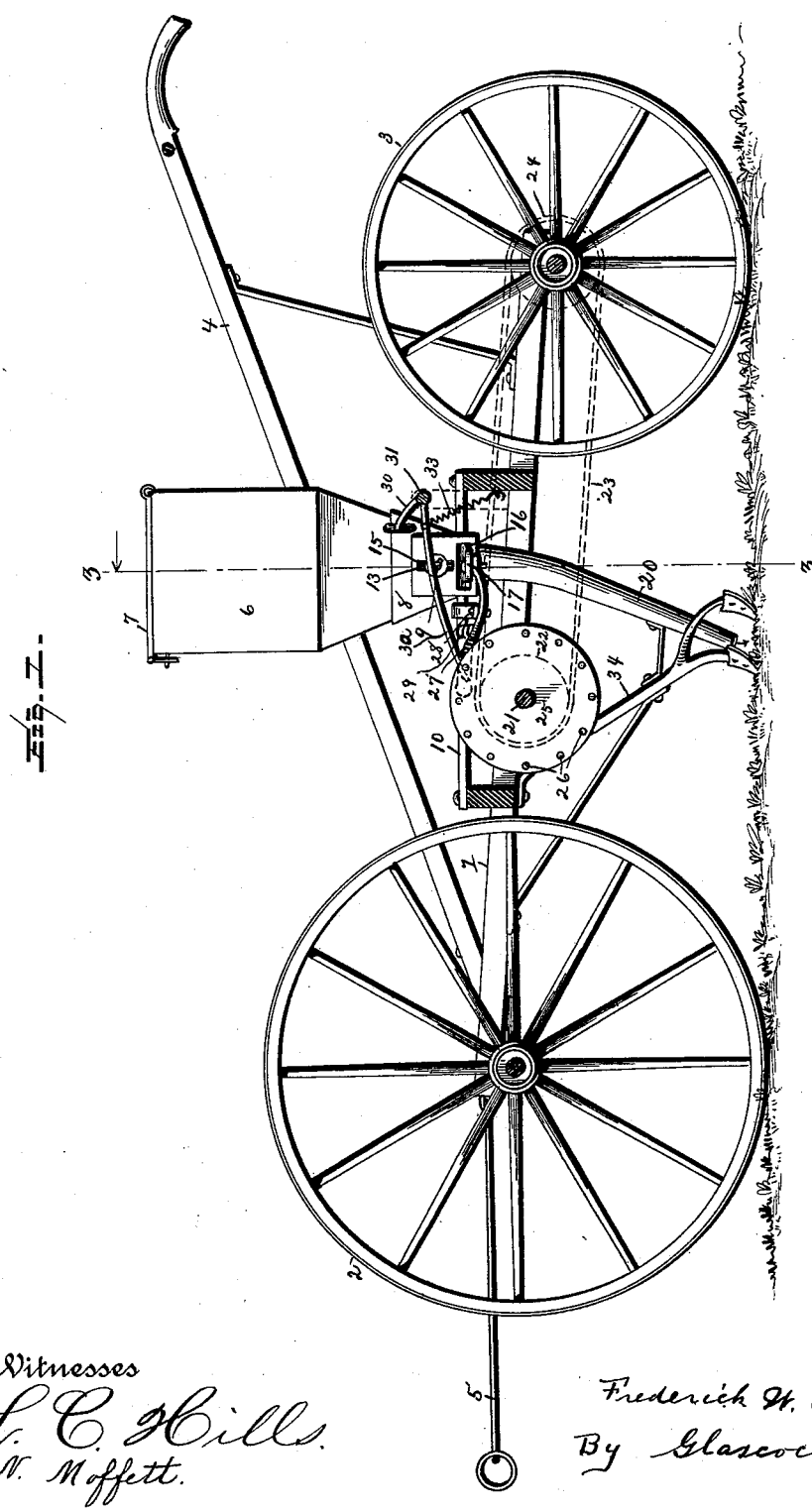
Witnesses
L. C. Hills.
N. Moffett.
Inventor
Frederick W. Ohlinger
By Glascock & Co
Attorneys.

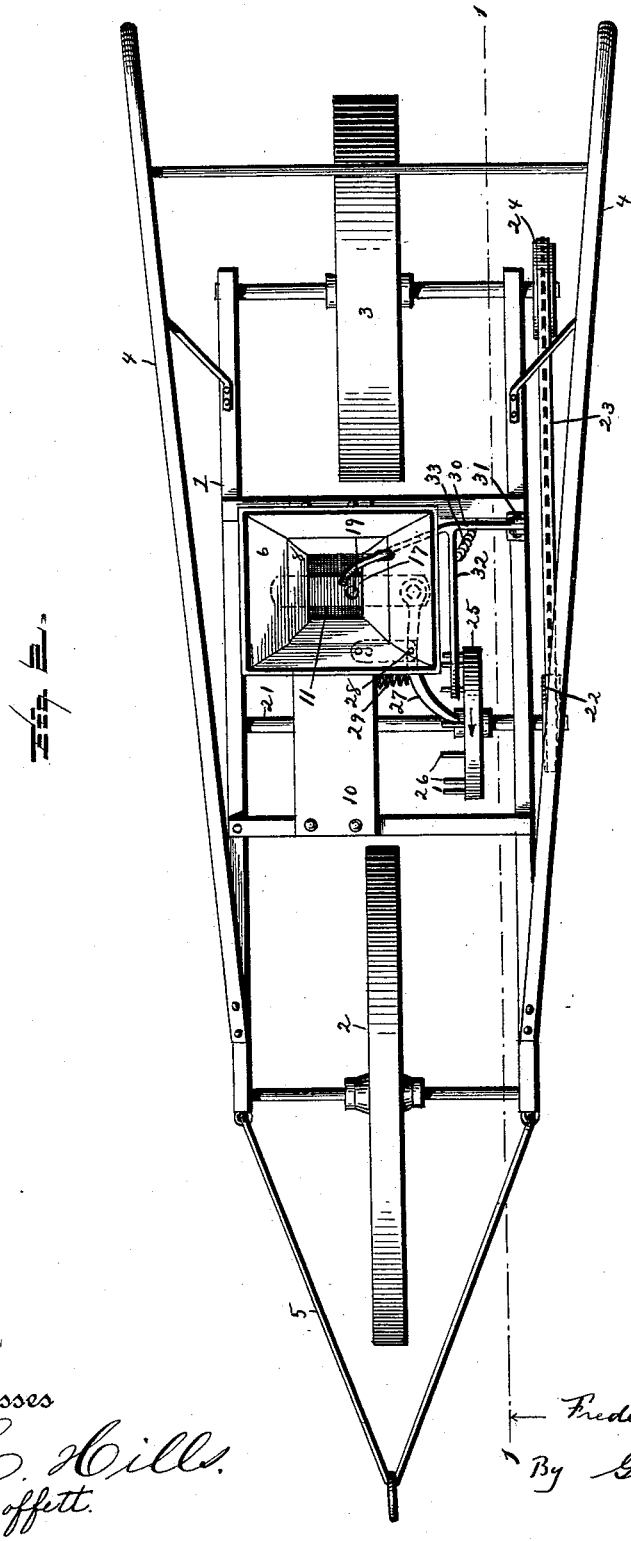

(No Model.)   F. W. OHLINGER.   3 Sheets—Sheet 3.
SEED PLANTER.
No. 507,924.   Patented Oct. 31, 1893.
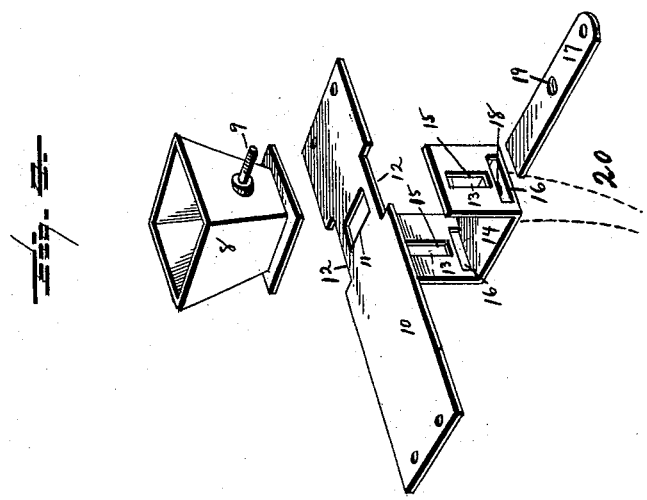
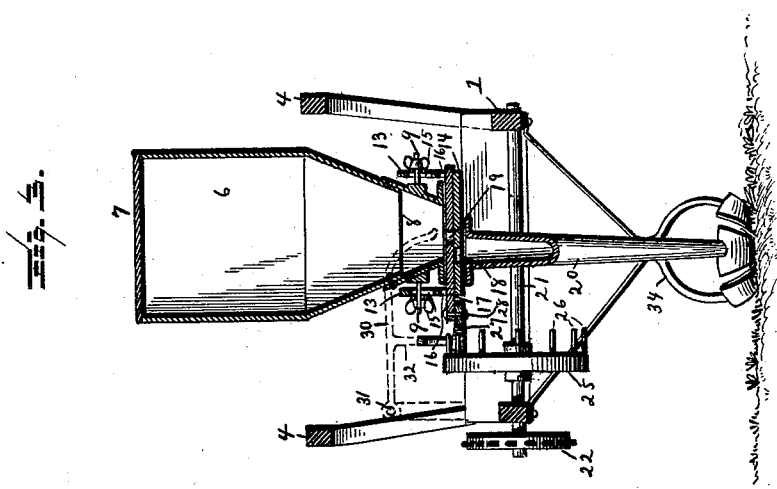
Witnesses
L. C. Hills.
N. Moffett.
Inventor
Frederick W. Ohlinger
By. Glascock & Co
Attorneys.

UNITED STATES PATENT OFFICE.

FREDERICK W. OHLINGER, OF WINTER HAVEN, FLORIDA.

SEED-PLANTER.

SPECIFICATION forming part of Letters Patent No. 507,924, dated October 31, 1893.

Application filed March 31, 1893. Serial No. 468,515. (No model.)

*To all whom it may concern:*

Be it known that I, FREDERICK W. OHLINGER, a citizen of the United States, residing at Winter Haven, in the county of Polk and State of Florida, have invented a certain new, useful, and valuable Improvement in Seed-Planters, of which the following is a full, clear, and exact description.

My invention has relation to seed planters and it consists in the novel construction and arrangement of its parts.

In the accompanying drawings:—Figure 1, is a side view partly in section of my invention. Fig. 2, is a top plan view of my invention. Fig. 3, is a transverse sectional view of my invention on the line 3, 3, of Fig. 1, and Fig. 4, is a detail perspective view of the lower part of the hopper and its attachments.

My invention is described as follows: It consists of a frame 1, mounted on wheels 2, and 3. The said wheels are journaled in the central width of the planter, the wheel 2, being in front and the wheel 3, behind. The frame is provided with the handle 4, 4, and a suitable clevis or draft bail 5. The rim of the wheel 2, is comparatively narrow, while that of the wheel 3, is broad. The wheel 3, is adapted to pass over the seed and press the earth closely around them. The hopper 6, is mounted on the frame 1. Said hopper has a hinged lid 7, and the lower parts of the perpendicular sides, converge inward. The hopper is secured in the base 8. The said base is provided on opposite sides with the threaded lugs 9, 9, which in turn are provided with suitable taps or nuts as shown. The base 8, is secured to the board 10, which in turn is secured to the cross-piece of frame 1. The said board 10, is provided with the perforation 11, which comes under the base 8, and the recesses 12, 12, in the longitudinal sides opposite the perforation 11. The recesses 12, 12, are adapted to hold the perpendicular flanges 13, 13, of the part 14. Said perpendicular flanges are provided with the elongated perforations 15, 15 through which pass the lugs 9, 9, of the hopper base and are secured therein by the taps or nuts. The perpendicular flanges 13, 13, are also provided with the horizontal elongated perforations 16, 16 which are adapted to hold the seed slide 17. The part 14, is also provided with a perforation 18. The seed-slide 17, is not so thick as the perforations 16, 16, are deep. Thus if it is desired that a greater quantity of seed should be dropped a thicker seed-slide can be put in by lowering part 14 and securing it in the perpendicular elongated perforations 15, 15. The said seed slide 17, is provided with a seed perforation 19. A chute 20, is secured to the part 14, and connects with the perforation 18. Said chute is adapted to convey the grain from the said hopper to the ground. Journaled in the frame in front of the hopper is the shaft 21, which has secured on one end the sprocket wheel 22, which is connected by the sprocket chain 23, with the sprocket wheel 24, secured on one end of the axle of the wheel 3. The shaft 21, has secured on it the pin-wheel 25, which is provided on one side with a number of pegs 26, set at regular intervals around the said wheel at equal distances from the center. One end of the lever 27, is pivoted to one end of the seed-slide 17. Said lever is fulcrumed at a point 28, to the frame, and the free end of the said lever is adapted to engage the ends of the pegs, 26, as the wheel 25, revolves. Thus the free end of the lever 27, is pushed in by the pegs 26. This throws the other end of the said lever out, and when the peg has passed beyond the free end of the said lever the spring 29, pushes the free end of said lever in. Thus the seed-slide 17, is given an in and out motion, which brings its perforation 19, at regular intervals over the perforation 18. Thus the seed which lodge in the perforation 19, are conveyed from the hopper to the chute 20, and from thence to the ground. To be sure that the seed in the hopper 6, will lodge in the perforation 19, of the seed-slide an agitator 30, is provided. Said agitator consists of an arm having one end pivoted at the point 31, to the frame 1. The other end of the said arm enters the said hopper through the side thereof and the extreme end of the said arm works over the perforation 19, of the said seed-slide. The said arm is provided with an extension 32; the extreme end of which is adapted to rest on the sides of the pegs 26, and the spring 33, holds the said extension down on the pegs. Thus it will be seen that as the wheel 25, revolves the extension 32, drags along on the pegs which give the free end of the said agitator a lateral or from side to side motion, which punches the seed in the perforation 19, in the said seed-slide. A plow stock 34, is secured to the frame 1, and to the lower end of the said stock is escured the plow plates, the middle one of which is further to the front than the two on either side thereof. The outlet of the chute 20, is just behind the middle plow point and the seed is deposited in the furrow made by that point, and the two side points cover the seed with earth and the wide rim of the rear wheel presses the said earth closely about the said seed. Thus the seed is planted.

Having described my invention, what I claim as new, and desire to secure by Letters Patent, is—

1. A seed planter consisting of a hopper mounted on a frame, said hopper having a seed slide and agitator, said frame mounted on a pair of wheels, a sprocket wheel attached to the axle of one wheel, a shaft journaled to the frame, a wheel having suitable pegs and a sprocket wheel attached to said shaft, a sprocket chain surrounding the two said sprocket wheels, the seed slide and agitator engaging the pegs of the wheel on the shaft and adapted to be operated thereby as set forth.

2. In a seed planter a hopper having a base provided on opposite sides with threaded lugs; a part having perpendicular flanges provided with perpendicular elongated perforations and suitable seed slide with perforations, the perpendicular elongated perforations adapted to receive the lugs of the hopper base, as set forth.

In testimony whereof I affix my signature in presence of two witnesses.

FREDERICK W. OHLINGER.

Witnesses:
WM. UPCHURCH,
A. J. POWELL.